United States Patent
Koeppel et al.

(10) Patent No.: US 11,077,600 B2
(45) Date of Patent: Aug. 3, 2021

(54) DEVICE FOR PRODUCING AND FILLING CONTAINERS

(71) Applicant: KOCHER-PLASTIK MASCHINENBAU GMBH, Sulzbach-Laufen (DE)

(72) Inventors: Karl Koeppel, Rainau (DE); Manfred Schreckenhoefer, Sulzbach-Laufen (DE); Sven Schneider, Abstgmuend (DE); Dmitri Kirchmaier, Obersontheim (DE); Klaus-Peter Brenner, Schwaebisch Gmuend (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 0 days.

(21) Appl. No.: 16/647,925

(22) PCT Filed: Sep. 6, 2018

(86) PCT No.: PCT/EP2018/073935
§ 371 (c)(1),
(2) Date: Mar. 17, 2020

(87) PCT Pub. No.: WO2019/057499
PCT Pub. Date: Mar. 28, 2019

(65) Prior Publication Data
US 2020/0262126 A1  Aug. 20, 2020

(30) Foreign Application Priority Data
Sep. 20, 2017   (DE) .................... 10 2017 008 802.0

(51) Int. Cl.
  *B29C 49/46*  (2006.01)
  *B65B 3/02*   (2006.01)
  (Continued)

(52) U.S. Cl.
  CPC ............. *B29C 49/04* (2013.01); *B29C 49/46* (2013.01); *B65B 3/022* (2013.01); *B65B 9/24* (2013.01);
  (Continued)

(58) Field of Classification Search
  CPC . B29C 2049/4664; B29C 49/46; B65B 3/022; B65B 9/24
  See application file for complete search history.

(56) References Cited

U.S. PATENT DOCUMENTS

| 4,967,539 A | 11/1990 | Hansen |
| 2010/0037566 A1 | 2/2010 | Hansen |
| 2011/0076355 A1 | 3/2011 | Hansen |

FOREIGN PATENT DOCUMENTS

| CN | 104723536 | 9/2017 |
| DE | 38 32 566 | 4/1990 |

(Continued)

OTHER PUBLICATIONS

International Search Report (ISR) dated Jan. 7, 2019 in International (PCT) Application No. PCT/EP2018/073935.

*Primary Examiner* — Robert B Davis
(74) *Attorney, Agent, or Firm* — Wenderoth, Lind & Ponack, L.L.P.

(57) ABSTRACT

A device produces and fills containers, in which at least one hose of plasticized plastic material emerging from an extrusion head (2) can be extruded into an opened mold. A filling device (14) can be used to at least introduce the filling material into the relevant container by filling mandrels (12), which, at least during operation, extend through the extrusion head (2) along at least one row of passages (40). The extrusion head (2) has a cuboid shell (20, 22). The overall height (H) of the extrusion head (2), viewed in parallel to the orientation of the relevant filling mandrel (12), is smaller (Continued)

than the length (L) of the extrusion head (2), viewed along the pertinent row of passages (40).

30 Claims, 4 Drawing Sheets

(51) Int. Cl.
*B65B 9/24* (2006.01)
*B29C 49/04* (2006.01)
*B29L 31/00* (2006.01)

(52) U.S. Cl.
CPC . *B29C 2049/4664* (2013.01); *B29L 2031/712* (2013.01)

(56) References Cited

FOREIGN PATENT DOCUMENTS

| | | |
|---|---|---|
| DE | 10 2007 015 078 | 12/2008 |
| DE | 10 2008 028 772 | 12/2009 |
| EP | 0 361 123 | 4/1990 |
| WO | 2009/152979 | 12/2009 |
| WO | 2017/054903 | 4/2017 |

DEVICE FOR PRODUCING AND FILLING CONTAINERS

FIELD OF THE INVENTION

The invention relates to a device for producing and filling containers, in which at least one hose of plasticized plastic material emerging from an extrusion head can be extruded into an opened mold. A filling device can be used to at least introduce the filling material into the relevant container by filling mandrels that, at least during operation, extend through the extrusion head along at least one row of passages.

BACKGROUND OF THE INVENTION

Devices of this type are state of the art. WO 2009/152979 discloses a device working in accordance with the well-known Bottelpack® system, which permits automated forming (blowing or vacuum forming), filling and closing of containers in an economical way. In particular, it can be used to produce polymer hoses before the actual production of the containers. The hoses are characterized by very homogeneous wall thickness distributions, which in turn is a prerequisite for very homogeneous wall thickness distributions of the subsequently resulting filled and closed containers. This wall thickness is mainly due, in turn, to the tall design of the extrusion head in accordance with the state of the art, which permits homogenization of the plastic melt in the melt ducts, in particular in the ducts running vertically, i.e. in parallel to the filling mandrel. Due to these conditions, a considerable amount of installation space is required in the manufacturing rooms for the known devices of this type. As shown in that document, and as can be seen in particular in FIG. 1, a lot of space is required in the vertical direction, starting from a lower forming device located beneath a base frame encompasses the extrusion head. On the extrusion head, in turn, a vertical mandrel holder is mounted, at which the filling device having the individual filling mandrels is mounted to be moved in the vertical direction in an adjustable manner. The necessary height of the extrusion head results in correspondingly long filling mandrels, which require guides inside the extrusion head to permit precise movements. This arrangement is disadvantageous for the circulation of sterile air around the filling mandrels prescribed for filling medical products. Guide bushes or air bearings can severely impair the desired laminar gas flow.

SUMMARY OF THE INVENTION

In view of this issue, the invention addresses the problem of providing a device of this type that is in particular characterized by
  the extrusion of a plastic hose having a homogeneous wall thickness distribution,
  a reduced need for installation space, especially installation height, and
  an undisturbed routing of the sterile air flow According to the invention, this problem is basically solved by a device having, as an essential feature of the invention, an extrusion head having a cuboidal shell and having an overall height of the extrusion head, viewed in parallel to the orientation of the relevant filling mandrel, that is smaller than the length of the extrusion head viewed along the pertinent row of passages. The design of the extrusion head as a flat shell permits a matching reduction in height of the base frame encompassing the extrusion head. This height reduction forms the basis for the construction of the further device units above, resulting overall in a substantial reduction in the total height of the device and a correspondingly reduced installation space required for the device. The designation "cuboid" refers to the basic construction of the flat shell, which may have attachments that may cause deviations from the pure cuboid shape. The deviations may also include flattenings, roundings, bevels etc. of the cuboidal basic body.

In particular, the flat shell is formed by two shell parts, as upper and lower shell parts. Their end faces facing each other are in contact with each other along a common parting plane. The parting plane preferably extending horizontally is perpendicular to the individual, preferably vertically movable, filling mandrel. Furthermore, the shell parts each have a flat cuboid shape when viewed separately.

The extrusion head according to the invention serves to extrude an annular hose, which is closed to the environment and is sterile. The invention achieves laminar routing of the sterile air flow and the guide free arrangement of the filling mandrels in the extrusion head.

In advantageous exemplary embodiments, the cuboidal shell has two shell parts, of which at least one shell part has a duct guide for the plasticized plastic material. The duct guide contains an annular space, in the center of which a support strut is arranged. The support strut has individual longitudinal receptacles in the form of passages for the penetration of the individual filling mandrels. These mandrels are arranged in a straight row, as is customary for such devices. In the present exemplary embodiment, they extend along the long sides of the cuboid shell. A continuous row of individual, mutually adjacent passages for twelve filling mandrels is provided in the support strut. The overall shell built in this way forms the flat shell as a whole.

Preferably, the duct guide and its individual ducts are formed by both shell parts. Particularly preferably, half of the respective cross-sections of the duct are formed by the individual duct guide of every shell part.

According to the invention, the plasticized plastic material can be supplied to the annular space of at least two supply ducts. For this purpose, one free end of these supply ducts opens into the annular space, and the other free end opens into a feed duct, which is perpendicular to the supply ducts.

The arrangement can be advantageously made such that the feed duct is part of a feeder, which is placed on an end area of an upper shell part extending along a narrow side of the shell and which at least partially covers the upper shell part.

One free angled end of the feeder can be connected to a central supply of an extruder, which supplies the plasticized plastic material.

In advantageous exemplary embodiments, the feed duct in the feeder supplies the supply ducts with plasticized plastic material in the manner of a downspout.

In a special design, the arrangement can be such that the supply ducts preferably enclose the annular space at least partially in the manner of tongs and their bent end sections opening into the annular space. The other two free ends of the supply ducts open into a common supply point, into which the feed duct of the feeder opens vertically. However, the feeder can also be advantageously designed in such a way that the feed duct opens horizontally into the supply ducts, resulting in a significant shortening of the flow paths of the plastic.

Advantageously, the annular space and the supply ducts are equally formed by recesses in both parts of the shell. The recesses are penetrated by the support strut having the passages for the respective filling mandrels and extending centrally and in parallel to the long sides of the extrusion head.

In the case of advantageous exemplary embodiments, the relevant filler mandrel is accommodated longitudinally movably within the respectively assignable recess in the support strut at a radial spacing. Because of the flat design of the extrusion head, the guidance of the filler mandrels in the extrusion head can be omitted. The installation of mandrel guide bushes, bearings or the like, as are required for extrusion heads of conventional design, which impairs the sterile air, can then be omitted.

The extrusion head may have hose dispensing openings on its underside. The free cross-section of the dispensing openings is adjustable and serves to dispense the extruded hose to the respective mold for container production.

The specifications "vertical" and "horizontal" also include designs, which deviate slightly from this directional course.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
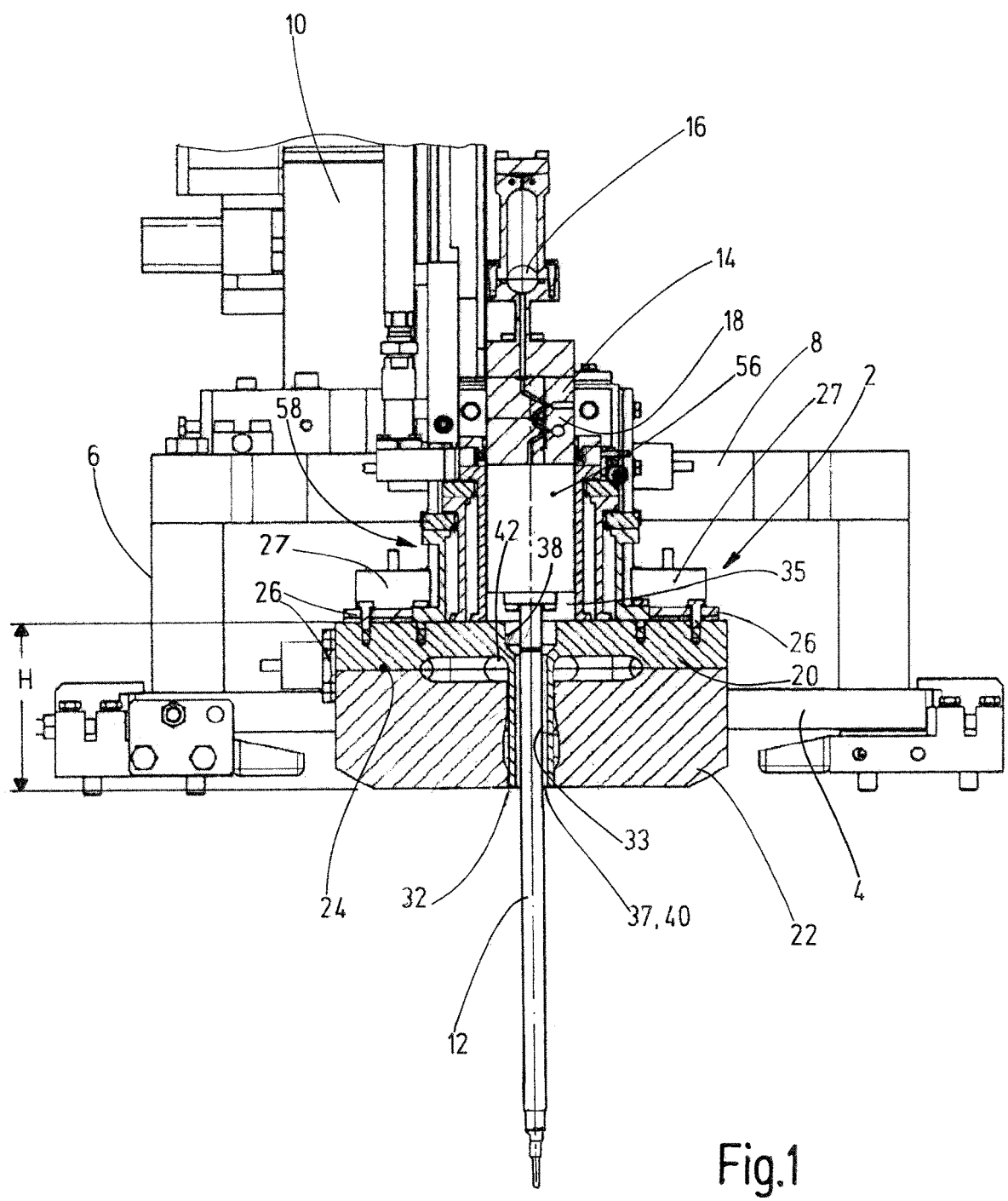
FIG. 1 is a partial side view in section of a container producing and filling device according to an exemplary embodiment of the invention, wherein only the device area adjacent to the extrusion head is shown and the only visible filling mandrel is shown in the extended filling position.

FIG. 1 shows only the parts of the device adjacent to an extrusion head 2 of the exemplary embodiment of the device according to the invention. The extrusion head 2 is mounted on a base frame 4. Together with vertical beams 6 and horizontal beams 8, base frame 4 forms a device frame encompassing the extrusion head 2. Further device units are mounted on the upper, horizontal beams 8 of the base frame 4, namely a mandrel holder 10. Mandrel holder 10 extends vertically as a columnar design, as usual for such devices (see FIG. 1 of the document referred to in the state of the art) and on which the relevant filling mandrels 12 in conjunction with an associated filling device 14 can be moved adjustably in the vertical direction. FIG. 1 shows the filling mandrels 12 in the extended filling position, in which they extend into an opened forming device (not shown). The filling devices 14 receive filling material from a central filling material line 16 and have a controllable metering unit 18 for every filling chamber 12. As described in document DE 10 2008 028 772 A1, the dosing units 18 dispense the dose quantity of the product required for every filling process in a clocked manner to the inner (not shown) filling duct of the relevant filling mandrel 12.

Figure 2:
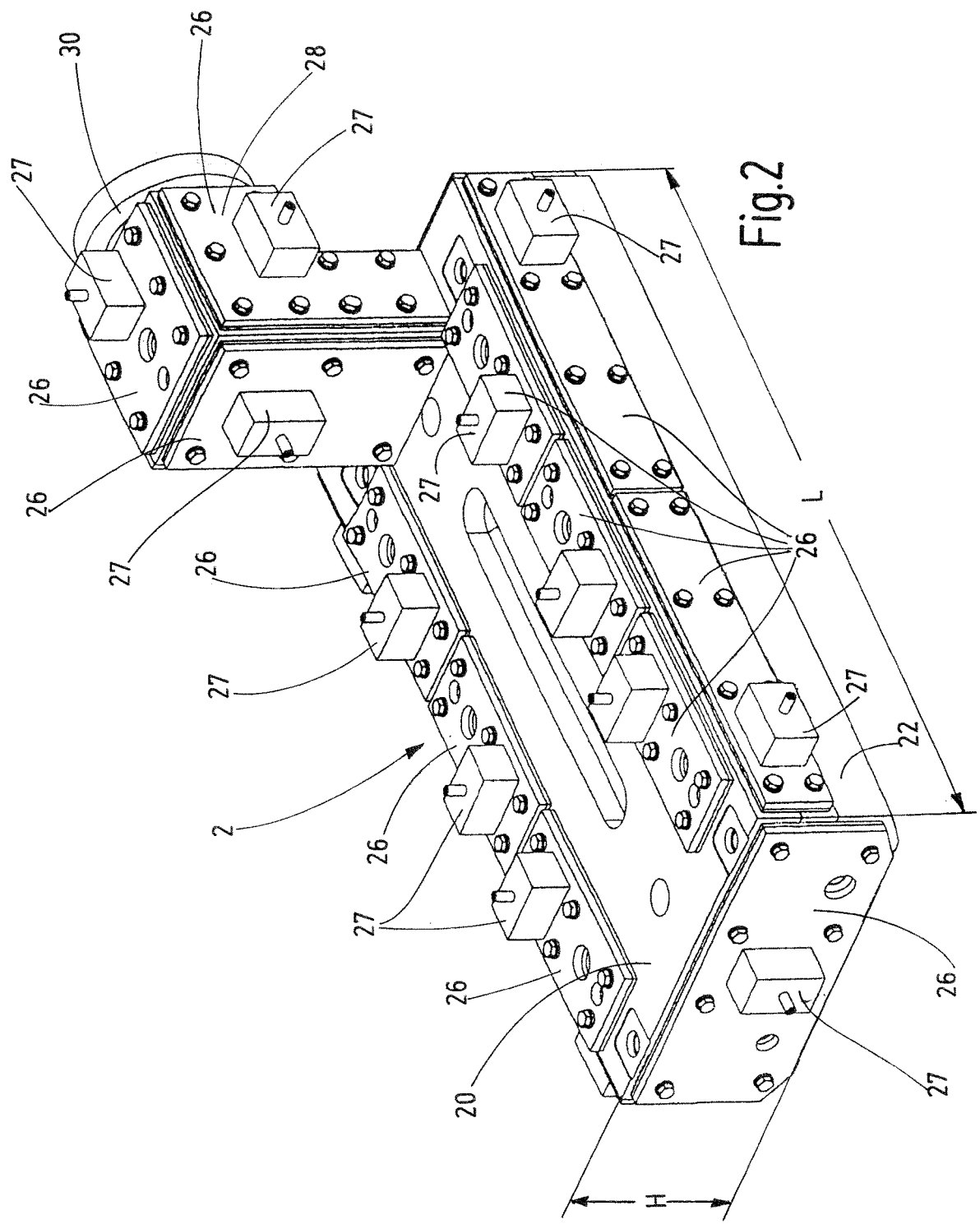
FIG. 2 is a perspective oblique view, magnified compared to FIG. 1, of the separately shown extrusion head of the exemplary embodiment.

As FIG. 2 shows, the extrusion head 2 has the shape of a flat shell, the main part of which forms a rectangular cuboid. In the illustration in FIG. 1, the cutting plane extends along the narrow side of the cuboid. The shell-shaped extrusion head 2 is formed by two shell parts, an upper shell part 20 and a lower shell part 22. Both shell parts 20 and 22 rest against each other on a flat contact surface 24 and are interconnected by screws (not shown). A total of twelve heating plates 26 (not all visible and numbered) are screwed onto the extrusion head 2. The heating plates 26 are connected via their heating plate connection elements 27 (not all numbered). On the narrow side on the right in FIGS. 2 and 3, a feeder 28, equipped with further heating plates 26, is mounted on the end area of the upper shell part 20. Feeder 28 covers about half of this narrow side in a central arrangement. The angled upper end 30 of the feeder 28 can be connected to an extruder (not shown), from which plasticized plastic material can be routed to the extrusion head 2 to form the hose for producing containers by extruding the plastic material routed in from hose dispensing openings 32, of which only one is visible in FIG. 1, assigned to the only visible filling mandrel 12.

As can be seen most clearly in FIG. 1, the upper shell part 20 has a support strut 36 (FIG. 4) extending centrally and in parallel to the long sides. Starting from an elongated hole 38 forming the entrance for the filling mandrels 12 and located in the upper side of the upper shell part 20, support strut 36 extends continuously through the other shell part 22 and has internal passages 40 for the filling mandrels 12, which can move freely therein. Sterile air flows from a feed 35 below the retaining strip 56 in the sterile air duct 33 along the filling mandrels 12 in the passages 40 and exits at the sterile air outlet 37 of the extrusion head 2, but continues to envelop the filling mandrels 12 in a laminar flow and in that way protects them from contamination. The support strut 36 passes through an annular space 42, which forms part of a duct for the plasticized plastic material and is connected to the dispensing openings 32 inside the lower part of the shell 22. As FIG. 1 shows, the annular space 42 and the supply paths of the duct guide, which open into the annular space 42, are formed jointly by the same recesses in the contact surface 24 of the upper shell part 20 and of the lower shell part 22.

Figure 3:
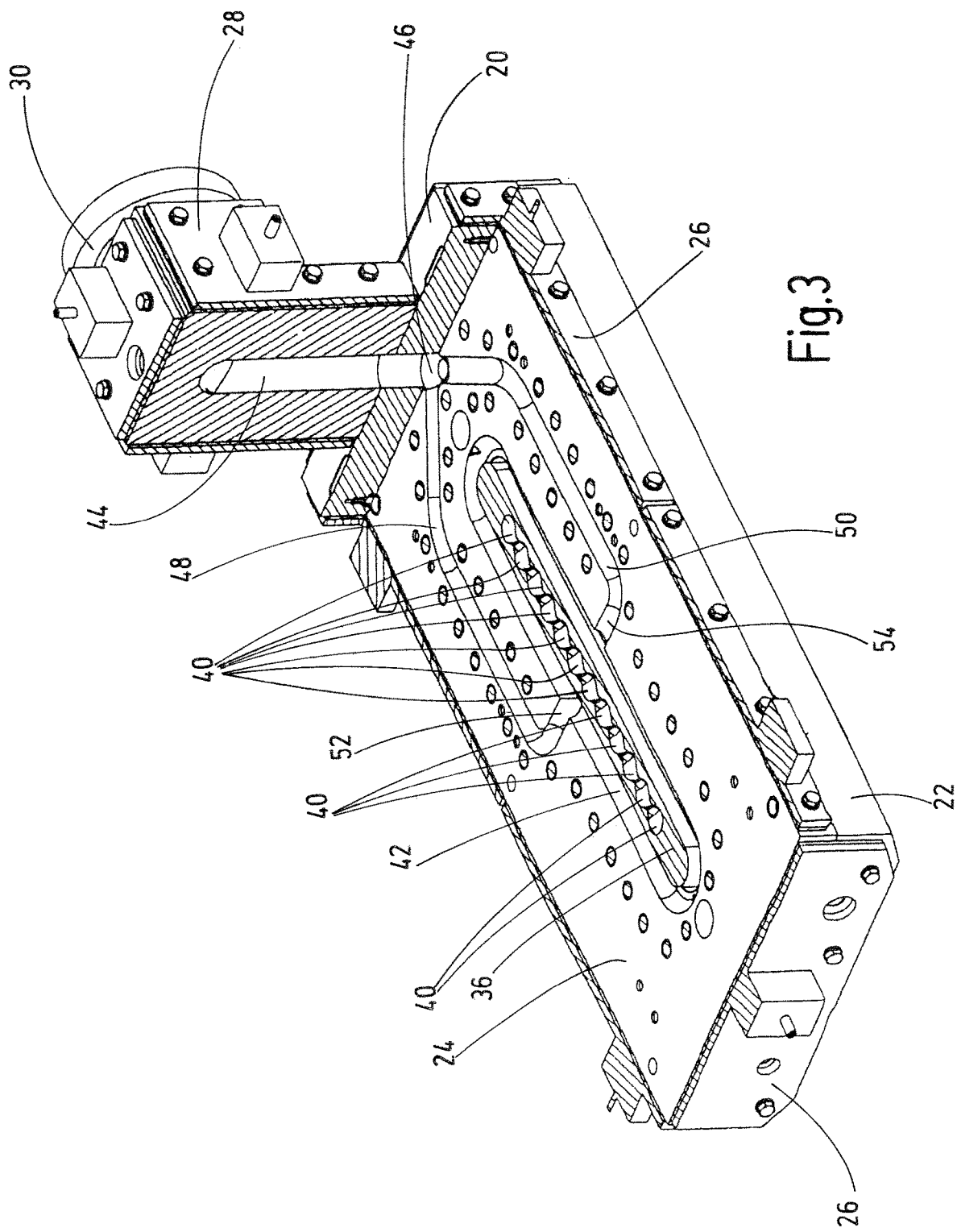
FIG. 3 is a perspective view of the extrusion head of FIG. 2 drawn partly in vertical section and mostly in horizontal section.

FIG. 3 shows the details of the duct guide. The feeder 28, which can be heated by the heating plates 26, has as the inlet part of the supply paths a duct in the form of a feed duct 44 extending centrally and essentially perpendicular to the upper shell part 20, which is routed to a distribution point 46. Distribution point 46 is formed between the upper shell part 20 and the lower shell part 22 and forms the inlet for the supply paths routed into the annular space 42. These supply ducts are formed by two supply ducts or duct parts 48 and 50, which start from the distribution point 46 and enclose the annular space 42 over half of its length in a pincer-shaped manner and whose curved end sections 52 and 54 open into the annular space 42.

It is particularly surprising to obtain a uniform velocity distribution of the polymer melt at the hose dispensing opening 32, and thus, a very uniform wall thickness distribution of the polymer hose according to the invention. Despite the low height (H) to length (L) ratio according to the invention, the extrusion head 2 only provides a short vertical homogenization section (between annular space 42 and hose dispensing opening 32), which is only about 65% of the height H of the extrusion head 2.

The upper ends of the short filling mandrels 12, whose length is approximately 3 to 4 times the height H of the extrusion head 2, are attached to a holding bar 56. The bar 56 is attached to a holding device 58, which is mounted above the upper shell 20 of extrusion head 2, for the clocked lifting movements. Due to the low height H of the extrusion head 2 itself and the short overall length of the filling mandrels 12, the arrangement of leading components such as bushings, bearings, etc. within the extrusion head 2 and especially within the passages 40 in the support strut 36 can be omitted. This arrangement permits an undisturbed flow of sterile air in the continuous cylindrical sterile air duct 33, in which a laminar flow can form that continues along the filling mandrels 12.

Figure 4:
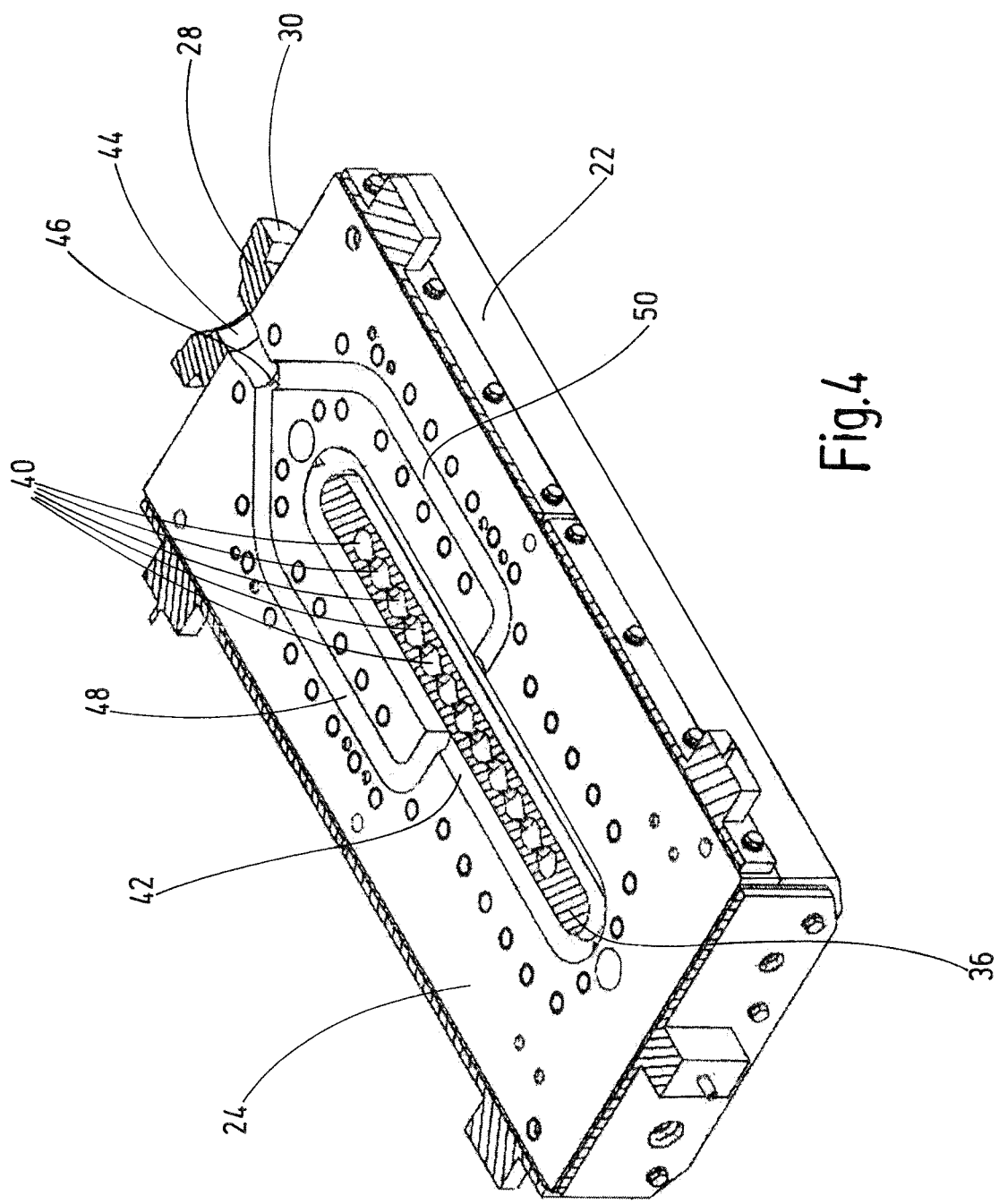
FIG. 4 is a perspective oblique view of a special design of an extrusion head drawn in horizontal section according to a further exemplary embodiment of the invention.

FIG. 4 shows a further preferred exemplary embodiment, in which the feed duct 44 is shortened compared to FIG. 3 and does not open vertically. At the distribution point 46, feed duct 44 opens almost horizontally into and is coplanar with the supply ducts 48 and 50. Surprisingly, the further reduction in the vertical flow path length of the melt compared to the design shown in FIG. 3 does not impair the above-mentioned homogeneity of the wall thickness. Furthermore, this design is advantageous because the length of the entire melt supply paths is considerably shortened and the horizontal entry results in a reduced flow resistance, and thus, in lower energy requirements.

As an alternative to the electrical heating described above, the hose head 2 and/or feeder 28 can also be heated by other methods, for instance inductive heat input.

While various embodiments have been chosen to illustrate the invention, it will be understood by those skilled in the art that various changes and modifications can be made therein without departing from the scope of the invention as defined in the claims.

The invention claimed is:

1. A device for producing and filling containers, comprising:
    an extrusion head connectable to an extruder and capable of producing a hose of plasticized plastic material into an open mold;
    filing mandrels extending through the extrusion head during operation of the extrusion head in a row of passages in the extrusion head;
    a cuboid shell forming the extrusion head with an overall height in a direction parallel to the filling mandrels, the overall height being less than a length of the extrusion head in a direction parallel to the row of passages, the shell has first and second shell parts;
    a duct guide being in the first shell part for the plasticized material and containing an annular space with a center; and
    a support strut being arranged in the center of the annular space and having individual longitudinal receptacles forming the passages for penetration of the filling mandrels.

2. A device according to claim 1 wherein the ratio of the overall height to the length of the extrusion head is less than 0.5.

3. A device according to claim 2 wherein the ratio is less than 03.

4. A device according to claim 3 wherein the ratio is less than 0.2.

5. A device according to claim 1 wherein
    one free end of a supply duct is connected in fluid communication with the annular space to supply the plasticized plastic material to the annular space; and
    another free end of the supply duct opens in fluid communication into a feed duct.

6. A device according to claim 5 wherein the supply duct has first and second duct parts opposite one another on larger sides of the extrusion head.

7. A device according to claim 5 wherein the feed duct extends perpendicular to the supply duct.

8. A device according to claim 5 wherein the feed ducts extends coplanar with the supply duct at a distribution point.

9. A device according to claim 5 wherein the feed duct is part of a feeder on an end area of the first shell part and extends along a narrow side of the cuboid shell and partially covers the cuboid shell.

10. A device according to claim 5 wherein a free end of the feeder is connectable to a central supply of the extruder.

11. A device according to claim 6 wherein the first and second duct parts at least partially enclose the annular space in a pincer shape, have curved end sections opening into the annular space, and have other free ends opening into a common distribution point connected in fluid communication to the feed duct.

12. A device according to claim 6 wherein the annular space and the first and second duct parts comprise recesses in the first and second shell parts.

13. A device according to claim 1 wherein the filling mandrels are individually and longitudinally movably received in the support strut in at a predetermined radial spacing in the respective passages.

14. A device according to claim 1 wherein the overall height is less than 20 cm.

15. A device according to claim 1 wherein the overall height is less than 15 cm.

16. A device according to claim 1 wherein the overall height is less than 13 cm.

17. A device according to claim 1 wherein the length is less than 80 cm.

18. A device according to claim 1 wherein the length is less than 60 cm.

19. A device according to claim 1 wherein the length is less than 40 cm.

20. A device according to claim 1 wherein the filling mandrels are arranged in the passages without guidance at least during operation while maintaining a predeterminable radial spacing.

21. A device according to claim 1 wherein a laminar gas flows between the filling mandrels and the passages at least during operation.

22. A device for producing and filling containers, comprising:
    an extrusion head connectable to an extruder and capable of producing a hose of plasticized plastic material into an open mold;
    filing mandrels extending through the extrusion head during operation of the extrusion head in a row of passages in the extrusion head;
    a cuboid shell forming the extrusion head with an overall height in a direction parallel to the filling mandrels, the overall height being less than a length of the extrusion head in a direction parallel to the row of passages;
    one free end of a supply duct in the extrusion head being connected in fluid communication with an annular space in the extrusion head for supplying the plasticized plastic material to the annular space, another free end of the supply duct opening in fluid communication into a feed duct.

23. A device according to claim 22 wherein the supply duct has first and second duct parts opposite one another on larger sides of the extrusion head.

24. A device according to claim 22 wherein the feed duct extends perpendicular to the supply duct.

25. A device according to claim 22 wherein the feed ducts extends coplanar with the supply duct at a distribution point.

26. A device according to claim 22 wherein the feed duct is part of a feeder on an end area of the first shell part and extends along a narrow side of the cuboid shell and partially covers the cuboid shell.

27. A device according to claim 22 wherein a free end of the feeder is connectable to a central supply of the extruder.

28. A device according to claim 23 wherein the first and second duct parts at least partially enclose the annular space in a pincer shape, have curved end sections opening into the annular space, and have other free ends opening into a common distribution point connected in fluid communication to the feed duct.

29. A device according to claim 23 wherein the annular space and the first and second duct parts comprise recesses in the first and second shell parts.

30. A device for producing and filling containers, comprising:
an extrusion head connectable to an extruder and capable of producing a hose of plasticized plastic material into an open mold;
filing mandrels extending through the extrusion head during operation of the extrusion head in a row of passages in a support strut in the extrusion head without guidance at least during operation while maintaining a radial spacing; and
a cuboid shell forming the extrusion head with an overall height in a direction parallel to the filling mandrels, the overall height being less than a length of the extrusion head in a direction parallel to the row of passages.

* * * * *